United States Patent [19]

Frigo

[11] Patent Number: 5,502,587
[45] Date of Patent: Mar. 26, 1996

[54] NETWORK COMPRISING A SPACE DIVISION PHOTONIC SWITCH AND A TERMINAL WHICH FORMS AN OUTPUT SIGNAL FROM AN INPUT SIGNAL

[75] Inventor: Nicholas J. Frigo, Atlantic Highlands, N.J.

[73] Assignee: AT&T Corp., Murray Hill, N.J.

[21] Appl. No.: 268,427

[22] Filed: Jun. 30, 1994

[51] Int. Cl.$^6$ .......................... H04B 10/20; H04B 10/00; H04J 14/00
[52] U.S. Cl. ..................... 359/118; 359/117; 359/164; 359/165; 359/167
[58] Field of Search ................................ 359/118, 125, 359/137, 139, 117, 128, 140, 113, 115, 119, 120, 121, 123, 124, 164, 165, 166, 167, 168

[56] References Cited

U.S. PATENT DOCUMENTS

| | | | |
|---|---|---|---|
| 3,584,220 | 6/1971 | Nomura et al. | 359/168 |
| 4,730,301 | 3/1988 | McMahon | 359/119 |
| 4,879,763 | 11/1989 | Wood | 359/112 |
| 4,946,244 | 8/1990 | Schembri | 359/157 |
| 5,058,101 | 10/1991 | Albanese et al. | 359/137 |
| 5,073,980 | 12/1991 | Prucnal et al. | 359/140 |
| 5,212,577 | 5/1993 | Nakamura et al. | 359/124 |
| 5,221,983 | 6/1993 | Wagner | 359/125 |
| 5,309,266 | 5/1994 | Jacob et al. | 359/139 |
| 5,347,384 | 9/1994 | McReynolds et al. | 359/118 |

OTHER PUBLICATIONS

Chapman, D. A., Faulkner, D. W., "Use of reflected light for low data rate upstream signalling in a single mode passive optical network", IEE Proceedings, vol. 137, Pt. J, No. 2, Apr. 1990, pp. 108–114.

Dragone, C., "An N×N Optical Multiplexer Using a Planar Arrangement of Two Star Couplers", IEEE Photonics Technology Letters, vol. 3, No. 9, Sep. 1991, pp. 812–815.

Dragone, C., Edwards, C. A., Kistler, R. C., "Integrated Optics N×N Multiplexer on Silicon", IEEE Photonics Technology Letters, vol. 3, No. 10, Oct. 1991, pp. 896–899.

Glance, B., Koren, U., Burrus, C. A., Evankow, J. D., "Discretely–Tuned N–Frequency Laser For Packet Switching Applications Based on WDM", Electronics Letters, Jul. 18, 1991, vol. 27, No. 15, pp. 1381–1383.

Kobrinski, H., Cheng, S. S., "Laser Power Sharing in the Subscriber Loop", Electronics Letters, Aug. 27, 1987, vol. 23, No. 18, pp. 943–944.

Lin, Y.-K. M., Spears, D. R., "Passive Optical Subscriber Loops With Multiaccess", Journal of Lightwave Technology, vol. 7, No. 11, Nov. 1989, pp. 1767–1777.

Lu, K. W., Eiger, M. I. Lemberg, H. L., "Systems and Cost Analysis of Broad Band Fiber Loop Architectures", IEEE Journal on Selected Areas in Communications, vol. 8, No. 6, Aug. 1990, pp. 1058–1067.

Menendez, R. C., Wagner, S. S., Lemberg, H. L., "Passive Fibre–Loop Architecture Providing Both Switcher and Broadcast Transport", Electronic Letters, vol. 26, No. 5, Mar. 1, 1990, pp. 273–274.

Nicholson, G., "Use Of a Fibre Loop Reflector As Downstream Receiver and Upstream Modulator in a Passive Optical Network", Electronics Letters, Jun. 7, 1990, vol. 26, No. 12, pp. 827–828.

Stern, J. R., Ballance, J. W., Faulkner, D. W., Hornung, S., Payne, D. B., "Passive Optical Local Networks For Telephony Applications and Beyond", Electronics Letters, Nov. 19, 1987, vol. 23, No. 24, pp. 1255–1257.

Wood, T. H., Carr, E. C., Kasper, B. L., Linke, R. A., Burrus, C. A., "Bidirectional Fibre–Optical Transmission Using A Multiple–Quantum–Well (MQW) Modulator/Detector".

Primary Examiner—Leo Boudreau
Assistant Examiner—Bhavesh Mehta

[57] ABSTRACT

The present invention provides a communications network in which a space division photonic switch connects waveguides form two terminals and one of the terminals impresses data on an input signal to form an output signal which results in an efficient and secure network.

28 Claims, 2 Drawing Sheets

NETWORK COMPRISING A SPACE DIVISION PHOTONIC SWITCH AND A TERMINAL WHICH FORMS AN OUTPUT SIGNAL FROM AN INPUT SIGNAL

FIELD OF THE INVENTION

The invention relates to telecommunications networks and, more particularly, to telecommunications networks which use waveguides and photonic switching.

BACKGROUND OF THE INVENTION

The traditional architecture of a telecommunications network comprises a central office, remote terminals, and subscribers' equipment. Typically, the central office sends multiplexed electrical signals to the remote terminals which demultiplex the signals and send particular signals to devices of particular subscribers.

Recently, new architectures, optical networks, have been developed. Such networks are typically comprised of a central office, active remote nodes, optical network units, and subscribers' equipment. In this new architecture, waveguides, such as optical fibers, are used to connect central offices with remote nodes, and remote nodes with optical network units ("ONUs"). Optical signals from the central office are converted to electrical form, switched, converted back to optical form and sent to the ONUs. The use of optical fibers and the demand for more channels and higher capacity are increasing the projected throughput and complexity of telecommunications networks and the cost of remote receivers, transmitters, switches, and processors.

Passive Optical Networks ("PONs") have been proposed to alleviate these problems. In PONs, connections between the central office and the remote nodes, and connections between the remote nodes and the ONUs are made through optical fibers, eliminating the optical to electrical and electrical to optical conversions. Optical signals are sent from the central office and split into portions. Each portion is then sent to a particular ONU. The ONUs convert the optical signals to electrical signals and send the electrical signals to one or more subscribers' devices.

One current PON architecture is the broadcast PON, in which a common set of data signals is sent to all ONUs. However, in this architecture a particular ONU's data is sent to every other ONU, which wastes power and restricts the bandwidth capacity of the network. In addition, these networks are not secure because unauthorized ONU transmissions can corrupt the remote nodes.

Another known optical network architecture uses wavelength division multiplexing ("WDM") and demultiplexing of optical signals at remote nodes. To connect the central office to an ONU, the central office must transmit at the correct wavelength. WDM causes each optical signal to be directed to a single ONU and thus overcomes problems associated with broadcast PONs. Some WDM systems employ Remote Interrogation of Terminal Equipment ("RITE-Net"), a technique in which a portion of the downstream optical signal from the remote node is modulated by the ONU and returned to the remote node as the upstream optical signal. Cost and technological immaturity have kept WDM optical networks, and in particular WDM RITE-Net optical networks, from being implemented. A WDM RITE-Net technique is disclosed in a pending application to Darcie et al., Ser. No. 08/029,724, filed Mar. 11, 1993. The contents of that application are incorporated by reference herein.

SUMMARY OF THE INVENTION

In one form of the present invention a space division photonic switch at a remote node connects one of a plurality of waveguide loops from a primary terminal with one of a plurality of waveguide loops, each from a particular secondary terminal. In addition, at least one terminal takes a portion of an input data signal sent from another terminal via the appropriate connected waveguide loops, impresses data on the portion of the input data signal, and sends the impressed data signal out to another terminal as an output data signal.

The present invention retains the benefits of other switching arrangements while avoiding some of the less desirable aspects of those arrangements. For example, in its preferred form it is optically switched in a similar fashion to the switching WDM, but in response to a control signal, not by wavelength. Unlike the broadcast PON, the present invention provides a secure architecture, since the entire signal from the primary terminal goes to a single secondary terminal. Although the present invention in one form requires power in the field to effect the control signal for the photonic switch, in its preferred form, like PONs, it does not require converting an optical signal to an electrical signal and back to an optical signal during its transit from the primary terminal through the remote node to the secondary terminal.

The above discussed features, as well as additional features and advantages of the present invention, will become more readily apparent by reference to the following detailed description and the accompanying drawings.

DETAILED DESCRIPTION OF THE DRAWINGS

Figure 1:
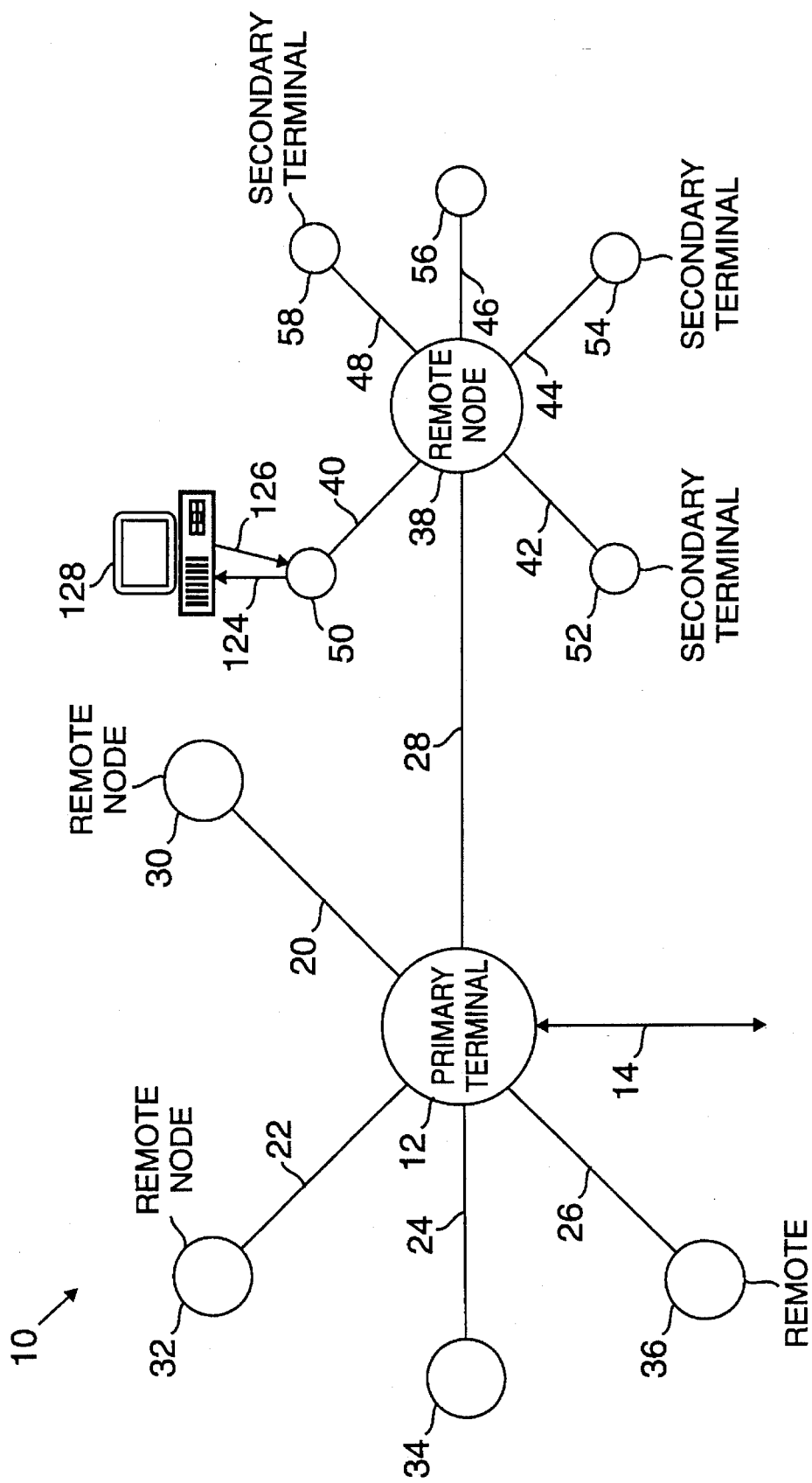
FIG. 1 is a schematic representation of a telecommunications network.

A telecommunications network 10 for providing communications between a primary terminal 12 and a plurality of secondary terminals 50–58, through remote nodes 30–38 is shown in FIG. 1.

The primary terminal 12 is connected to the remote nodes 30, 32, 34, 36, and 38 via waveguide loops 20, 22, 24, 26, and 28, respectively. The remote node 38 is further shown connected to secondary terminals 50, 52, 54, 56, and 58 via waveguide loops 40, 42, 44, 46, and 48, respectively. Each remote node is preferably similarly connected to secondary terminals, which are not shown. The secondary terminal 50 is shown connected to a subscriber's device, such as a PC terminal 128 with a modem, via output line 124 and input line 126. The primary terminal 12 is also preferably connected to further parts of the telecommunications network 10 (not shown) via an input/output bus 14. The input/output bus 14 may be connected to a plurality of further primary terminals, remote nodes, secondary terminals or subscribers' devices.

Each of the waveguide loops 20–28 and 40–48 may include one or more waveguides. Although a single waveguide can process both inputs and outputs, two waveguides are preferably provided for each of the waveguide loops 20–28 and 40–48, one being an input waveguide and the other being an output waveguide. Each waveguide loop is preferably an optical fiber loop, which is preferably includes both an input and an output optical fiber.

The operation of the circuitry of FIG. 1 is described below. The primary terminal 12 receives data from the input/output bus 14 and sends the data through the waveguide loop 28 to a remote node, such as the remote node 38, for example. The data is then sent by the remote node 38 to one or more of the appropriate secondary terminals 50–58, via waveguide loops 40–48, respectively. The secondary terminals 50–58 are each preferably connected to one or more subscribers' devices, only one of which, the personal computer 128, is shown connected to the secondary terminal 50 by the output line 124 and the input line 126. The subscribers' devices may be of any type, including telephones, data terminals, and video terminals.

Data transmission from a secondary terminal, such as terminal 50, to the primary terminal 12, occurs in a similar manner. Data is sent from the secondary terminal 50 to the remote node 38 via the waveguide loop 40 and is subsequently sent to the primary terminal 12 via the waveguide loop 28. The data is subsequently sent to further parts of the telecommunications network 10 via input/output bus 14. The data can be of any type, including voice, video, and computer digital signals.

Figure 2:
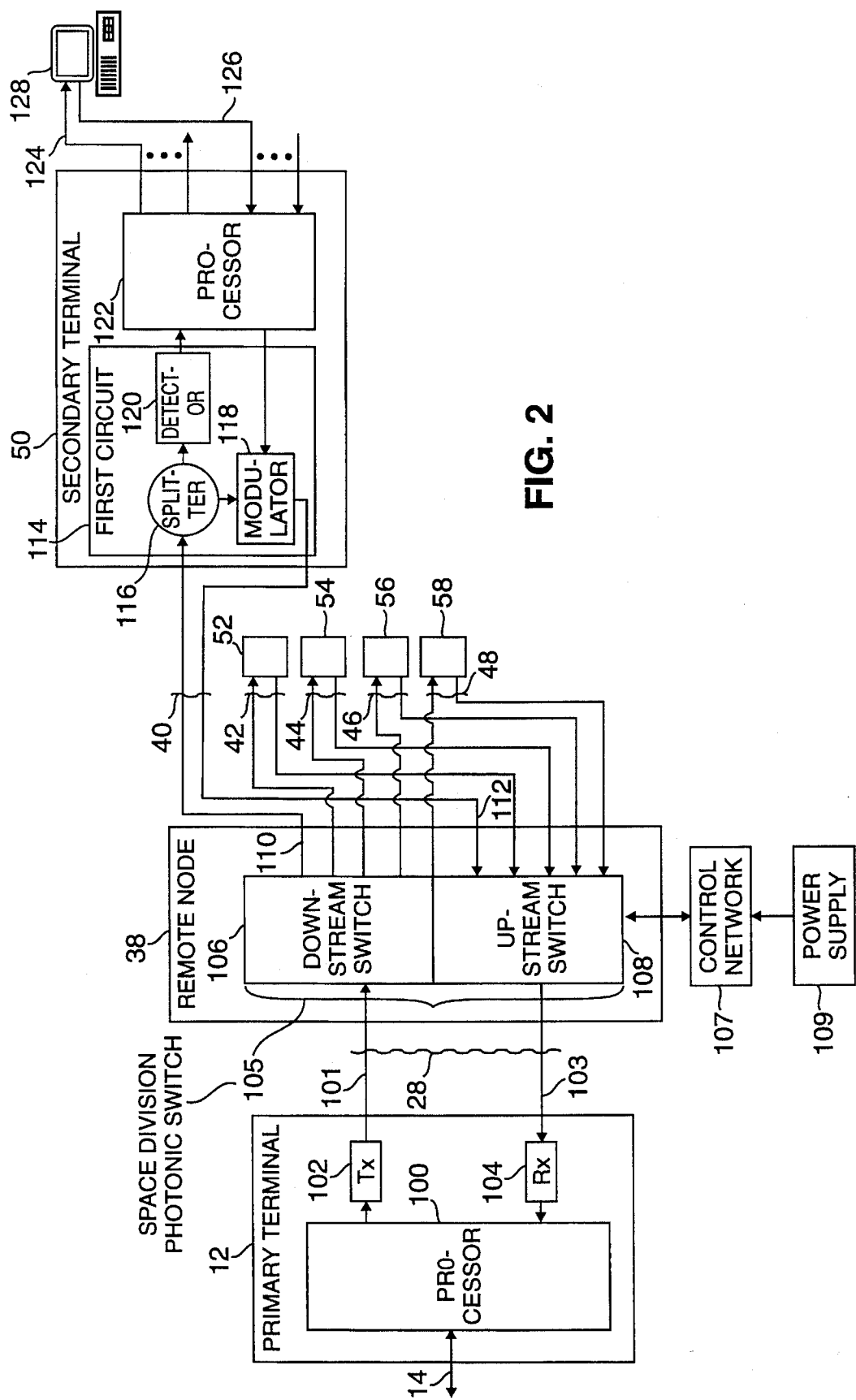
FIG. 2 is a schematic including details of a primary terminal, a remote node, and a secondary terminal suitable for utilization in the telecommunications network shown in FIG. 1 to result in an improved network according to the present invention.

FIG. 2 is a schematic showing one embodiment of detailed circuitry suitable for implementation of the primary terminal 12, the remote node 38, and the secondary terminal 50 in accordance with the present invention. The primary terminal 12 comprises a processor 100, a transmitter 102, and a receiver 104. The remote node 38 comprises a space division photonic switch 105 comprised of a downstream switch 106 and an upstream switch 108. The photonic switch 105 is preferably an electrically controlled optical switch and can be a space-division photonic switch as disclosed in K. Padmanabhan and A. N. Netravali, "Dilated Networks for Photonic Switching", IEEE Trans. on Comm. Vol. Com-35, pp. 1357–1365; December 1987. Each waveguide loop is preferably a fiber optic loop and the signals sent through the waveguide loops are preferably optical signals. The primary terminal is preferably a central office and the secondary terminals are preferably optical network units.

The secondary terminal 50 comprises a first circuit 114 which is comprised of a splitter 116, a modulator 118, and a detector 120. The splitter 116, modulator 118, and detector 120 may be integrated into a single device if desired. The secondary terminal 50 also comprises a processor 122.

The input/output bus 14 is connected to the processor 100 of primary terminal 12. The processor 100 is connected to the transmitter 102 and to the receiver 104. The transmitter 102 is connected to the downstream switch 106 of the remote node 38 via the output waveguide 101 of the waveguide loop 28. The receiver 104 is connected to the upstream switch 108 of the remote node 38 via the input waveguide 103 of the waveguide loop 28.

The downstream switch 106 and the upstream switch 108 are connected to a control network 107, which is connected to a power supply 109. The power can also be derived from, for example, the waveguide loop 28 or the waveguide loop 40. Alternatively, the control network 107 may be connected to the output waveguide 101 or the control network 107 may include a wireless device for communicating directly with the primary terminal 12. The control network 107 may also be a part of a larger control network. The control network 107 may also receive status information from downstream switch 106 or upstream switch 108 to control the switches in any manner known in the art.

The remote node 38 is connected to the secondary terminals 50–58 via the waveguide loops 40–48, respectively. More specifically, the downstream switch 106 is connected via the input waveguides to the secondary terminals 50–58 and the upstream switch 108 is connected via the output waveguides to the secondary terminals 50–58. For example, the downstream switch 106 is connected via the input waveguide 110 to the splitter 116 of the secondary terminal 50 and the upstream switch 108 is connected via the output waveguide 112 to the modulator 118 of the secondary terminal 50. The other secondary terminals 52–58 are connected in a similar manner to the remote node 38 and have similar components as the secondary terminal 50.

The splitter 116 is connected to the modulator 118 and to the detector 120, at first and second outputs of the splitter 116 respectively. The output of the modulator 118 is connected to the upstream switch 108 via the output waveguide 112. The detector 120 is connected to the processor 122. The processor 122 has a plurality of output lines, such as output line 124, and a plurality of input lines, such as input line 126, which are connected to a plurality of subscribers' devices, although only one device, the PC terminal 128, is shown connected to output line 124 and input line 126. Alternatively, the processor may include a single output line or input line connected to a single subscriber.

In operation, an input data signal is received by the primary terminal 12 from another part of the telecommunications network 10 via the input/output bus 14. The other part of the telecommunications network 10 may include further primary terminals, remote nodes, secondary terminals, and subscribers' devices. Assuming the input data signal is intended for the secondary terminal 50, the input data signal is received by the processor 100 of primary terminal 12 and a time multiplexed electrical input data signal is sent to the transmitter 102. The transmitter 102 preferably modifies the electrical input data signal by changing it to a transport input data signal, which is preferably an optical signal. The transport input data signal from transmitter 102 is sent to the downstream switch 106.

The downstream switch 106 is set by a control signal from the control network 107, in a known fashion. If, for example, the control signal has set the downstream switch 106 to input waveguide 110 of the secondary terminal 50, the transport input data signal appearing at the input of the downstream switch 106 is sent to the input waveguide 110 of the secondary terminal 50. The control signal can be derived from a separate source, from signals sent via waveguide loop 28, or via wireless signals sent to the remote node 38. The control signal can be provided as a function of time. If optical signals are transmitted by the transmitter 102, a portion of the optical signal received by the remote node 38 may be processed to form a control signal. The control signals should be synchronized with the transport input data signals, in a manner known in the art.

The transport input data signal appearing on the input waveguide 110 is received and split into two portions by the splitter 116 of the secondary terminal 50. A first portion of the transport input data signal is sent to the modulator 118, while a second portion of the transport input data signal is sent to the detector 120. The modulator 118 impresses data received from the processor 122 on the first portion of the transport input data signal, to form an output data signal, which is sent back to the primary terminal 12 via the upstream switch 108. The upstream switch 108 of the remote node 38 connects an output waveguide, such as output waveguide 112 of the secondary terminal 50, to the input waveguide 103 of the primary terminal 12, in response to a control signal from the control network 107, in a known manner.

The detector 120 at the secondary terminal 50 preferably changes the transport input data signal, which is preferably an optical data signal, to an electrical input data signal and sends the electrical input data signal to the processor 122. The processor 122 sends the electrical input data signal out to one of its subscriber output lines, such as output line 124. The electrical input data signal may alternatively be sent in another form to the processor 122, such as by wireless communication or through a waveguide.

A subscriber's device, such as the PC terminal 128, can input data to the processor 122 via the appropriate input line, in this case input line 126. The subscriber input data is sent to the modulator 118 and used to impress output data upon a portion of a transport input data signal received via the downstream switch 106 at the secondary terminal 50.

The primary terminal 12 and the secondary terminal 50 are preferably a central office and an optical network unit, respectively. The waveguide loops of FIG. 2 are preferably optical fiber loops and each waveguide is preferably an optical fiber. The transmitter 102 and receiver 104 are preferably an optical transmitter and an optical receiver, respectively.

The downstream switch 106 need not be connected to the same secondary terminal as the upstream switch 108 at the same time. The two switches should be connected independently to provide the most efficient switching. The most efficient switching may depend on distance of the appropriate secondary terminals from the remote node and the type and duration of the traffic.

The transmitter 102 may be replaced by a plurality of transmitters, sending, for example, optical signals of different wavelengths down the output waveguide 101. The splitter 116 may split a transport input data signal by differences in time, wavelength, sub-carrier frequency, or in any other manner known in the art. The modulator 118 may be supplemented by a coupler and a signal source so that the output signal from secondary terminal 50 comprises a feed back portion of a transport input data signal and an independent source signal.

The present invention provides communications between a primary terminal 12 and a plurality of secondary terminals through a plurality of remote nodes, where each remote node is preferably similar to the remote node 38. Although the embodiment of FIG. 2 described communications with other parts of the telecommunications network of FIG. 1 via input/output bus 14, the present invention may also provide communications from any remote node to any other remote node, for example, from remote node 38 to remote node 32, of FIG. 1.

I claim:

1. An apparatus for providing communications between terminals in a telecommunications network comprising:

at least one primary terminal comprising at least one waveguide loop;

a remote node comprising a space division photonic switch, the space division photonic switch being responsive to control signals from a control network:

a plurality of secondary terminals, each comprised of at least one waveguide loop and a first circuit comprised of a detector and a modulator, the first circuit responsive to signals from a processor;

wherein the space division photonic switch connects a waveguide loop of a primary terminal with a waveguide loop of a secondary terminal in response to a control signal from the control network; and wherein the first circuit of the secondary terminal receives an information bearing input signal from the primary terminal via the connected waveguide loops, separates said information bearing input signal into a first portion and a second portion, receives data from the processor, impresses the processor data on the second portion of the information bearing input signal to form an output data signal, and sends the output data signal to any other terminal.

2. The apparatus of claim 1 wherein the output data signal is sent to the primary terminal via the connected waveguide loops.

3. The apparatus of claim 1 further comprising a plurality of remote nodes.

4. The apparatus of claim 1 wherein the processor data is received by wireless communication by the first circuit.

5. The apparatus of claim 1 wherein the processor data is received through a hardwired electrical connection by the first circuit.

6. The apparatus of claim 1, wherein:

the space division photonic switch comprises an upstream switch and a downstream switch;

the waveguide loop of the primary terminal comprises an input waveguide and an output waveguide;

the waveguide loop of the secondary terminal comprises an input and an output waveguide;

the downstream switch connects the output waveguide of the primary terminal with the input waveguide of the secondary terminal in response to a first control signal from the control network; and the upstream switch connects the input waveguide of the primary terminal with the output waveguide of the secondary terminal in response to a second control signal from the control network.

7. The apparatus of claim 6, wherein the connected waveguide loops are optical fiber loops and the connected input and output waveguides are input and output optical fibers, respectively.

8. The apparatus of claim 1, wherein the connected waveguide loops are optical fiber loops.

9. The apparatus of claim 1, wherein the space division photonic switch is responsive to an electrical control signal.

10. The apparatus of claim 1, wherein the space division photonic switch is responsive to a wireless control signal.

11. The apparatus of claim 1, wherein the space division photonic switch is responsive to a control signal derived from a terminal through a waveguide loop.

12. The apparatus of claim 1, wherein the control signal is provided as a function of time.

13. The apparatus of claim 1, wherein the primary terminal is a central office and each of the plurality of secondary terminals are optical network units.

14. The apparatus of claim 1, wherein the first circuit of each of the plurality of secondary terminals is comprised of a coupler and a signal source, and wherein the coupler couples the signal from the signal source with the output data signal to form a coupled signal and sends the coupled signal to another terminal.

15. A method of providing communications between terminals in a telecommunications network comprising:

connecting a waveguide loop of a primary terminal with a waveguide loop of one of a plurality of secondary terminals through a remote node comprising a space division photonic switch responsive to control signals from a control network;

receiving an information bearing input signal at the secondary terminal from the primary terminal;

separating the information bearing input signal into first and second portions;

sending the first portion of the information bearing input signal to a detector;

sending the second portion to a modulator;

impressing data from a processor on the second portion of the information bearing input signal to form an output data signal; and sending the output data signal to any other terminal.

16. The method of claim 15, wherein the output data signal is sent to the primary terminal.

17. The method of claim 15, wherein the step of connecting a waveguide loop of a primary terminal with a waveguide loop one of a plurality of secondary terminals comprises connecting an input waveguide of the primary terminal with an output waveguide of the secondary terminal in response to a control signal.

18. The method of claim 17, wherein the connected waveguide loops are optical fiber loops and the connected input and output waveguides are input and output optical fibers, respectively.

19. The method of claim 15, wherein the step of connecting a waveguide loop of a primary terminal with a waveguide loop of one of a plurality of secondary terminals comprises connecting an output waveguide of the primary terminal with an input waveguide of the secondary terminal in response to a control signal.

20. The method of claim 19, wherein the connected waveguide loops are optical fiber loops and the connected input and output waveguides are input and output optical fibers respectively.

21. The method of claim 15, wherein the connected waveguide loops are optical fiber loops.

22. The method of claim 15, wherein the control signal is an electrical control signal.

23. The method of claim 15, wherein the control signal is an optical signal derived from a waveguide of a terminal.

24. The method of claim 15, wherein the control signal is provided through wireless communication.

25. The method of claim 15, further comprising providing the control signal as a function of time.

26. The method of claim 15, wherein the primary terminal is a central office and the plurality of secondary terminals are optical network units.

27. The method of claim 15, further comprising coupling the output data signal with a signal from a separate signal source to form a coupled signal and sending the coupled signal to another terminal.

28. An apparatus for providing communications between terminals in a communications network comprising:

at least one primary terminal;

at least one remote node connected to said primary terminal by a first waveguide loop and having at least one space division photonic switch responsive to control signals from a control network:

a plurality of secondary terminals each connected to said remote node by a respective second waveguide loop;

said space division photonic switch selectively connects said primary terminal to said secondary terminal in response to a control signal from said control network; and said secondary terminals each having a receiver for receiving an optical input signal over said respective waveguide, said receiver having a detector for detecting downstream information modulated onto said optical input signal when there is downstream information to be sent to said secondary terminal, and a splitter for sending a first portion of said optical input signal to said detector and a second portion of said optical input signal to a modulator, said modulator impresses upstream data onto said second portion of said optical input signal to form an upstream optical output signal and sends said upstream optical output signal to said primary terminal.

* * * * *